(12) United States Patent
Savard

(10) Patent No.: US 6,826,502 B2
(45) Date of Patent: Nov. 30, 2004

(54) METHODS AND SYSTEMS FOR CALIBRATION AND COMPENSATION OF ACCELEROMETERS WITH BIAS INSTABILITY

(75) Inventor: Thomas A. Savard, St. Paul, MN (US)

(73) Assignee: Honeywell International Inc., Morristown, NJ (US)

( * ) Notice: Subject to any disclaimer, the term of this patent is extended or adjusted under 35 U.S.C. 154(b) by 125 days.

(21) Appl. No.: 10/056,718

(22) Filed: Jan. 25, 2002

(65) Prior Publication Data

US 2003/0144808 A1 Jul. 31, 2003

(51) Int. Cl.[7] .................. G01C 19/00; G01C 25/00
(52) U.S. Cl. .................................................. 702/104
(58) Field of Search .......................... 702/85, 96, 104, 702/141, 127

(56) References Cited

U.S. PATENT DOCUMENTS

| | | | |
|---|---|---|---|
| 4,372,162 A | | 2/1983 | Shutt |
| 4,467,651 A | * | 8/1984 | Peters et al. ................. 73/497 |
| 4,611,304 A | | 9/1986 | Butenko et al. |
| 4,675,820 A | * | 6/1987 | Smith et al. ................ 701/220 |
| 4,750,363 A | | 6/1988 | Norling |
| 4,812,977 A | * | 3/1989 | Hulsing, II ..................... 702/6 |
| 4,891,982 A | | 1/1990 | Norling |
| 5,353,642 A | | 10/1994 | Hasegawa et al. |
| 5,505,410 A | | 4/1996 | Diesel et al. |
| 5,555,503 A | | 9/1996 | Kyrtsos et al. |
| 5,570,304 A | | 10/1996 | Mark et al. |
| 6,032,109 A | | 2/2000 | Ritmiller, III |
| 6,175,807 B1 | | 1/2001 | Buchler et al. |
| 6,179,067 B1 | * | 1/2001 | Brooks ......................... 175/45 |
| 6,498,996 B1 | * | 12/2002 | Vallot .......................... 702/104 |
| 6,622,091 B2 | * | 9/2003 | Perlmutter et al. ......... 701/214 |

FOREIGN PATENT DOCUMENTS

| | | |
|---|---|---|
| DE | 198 58 621 A1 | 7/2000 |
| WO | WO 01/11318 A1 | 2/2001 |

OTHER PUBLICATIONS

US 6,151,553, 11/2000, Estes et al. (withdrawn)
"IEEE Standard Specification Format Guide and Test Procedure for Linear, Single–Axis, Pendulous, Analog Torque Balance Accelerometer", The Institute of Electrical and Electronics Engineers, Inc. copyright 1971, pp. 8–53.

* cited by examiner

Primary Examiner—John Barlow
Assistant Examiner—Demetrius Pretlow
(74) Attorney, Agent, or Firm—Matthew Luxton, Esq.; Armstrong Teasdale LLP

(57) ABSTRACT

A method for determining compensation coefficients for accelerometers which exhibit bias transients is described. The method comprises estimating bias accumulation from measured accelerometer outputs, determining a corrected accelerometer output, and determining the compensation coefficients for the accelerometer.

27 Claims, 6 Drawing Sheets

US 6,826,502 B2

METHODS AND SYSTEMS FOR CALIBRATION AND COMPENSATION OF ACCELEROMETERS WITH BIAS INSTABILITY

STATEMENT REGARDING FEDERALLY SPONSORED RESEARCH & DEVELOPMENT

The United States Government has acquired certain rights in this invention pursuant to Contract No. DAAH01-98-C-0156 issued by the Department of the Army.

BACKGROUND OF THE INVENTION

This invention relates generally to calibration and compensation of accelerometers, and more specifically, to calibration and compensation of accelerometers with bias instability.

Most accelerometers incorporate one of two types of sensing elements. One sensing element type is a piezo-resistive sensor in which acceleration causes a resistance change in the sensing element itself. The resistance change thereby causes a change in a time constant upon which accelerometer output is based. The other sensing element type is a capacitive sensor. In such a sensor, capacitance change is caused by a change in the spacing between capacitive elements due to acceleration. The capacitance change therefore causes a change in a time constant upon which accelerometer output is based.

Certain known accelerometers demonstrate bias instability. The bias instability is typically one or more of temperature cycle hysteresis and high gravitational force bias accumulation, which is sometimes referred to as anelastic bias response. These instabilities are of concern, and may prevent use of certain accelerometers, in particular applications, for example, guidance products. However, with proper calibration and compensation, the accelerometers can be used effectively in some applications, particularly in applications where bias accumulation occurs during testing but not in the actual application.

BRIEF DESCRIPTION OF THE INVENTION

In one aspect, a method for determining compensation coefficients for accelerometers is provided. The method comprises estimating bias accumulation from measured accelerometer outputs, determining a corrected accelerometer output, and determining the compensation coefficients using the corrected accelerometer output.

In another aspect, a method for compensating for bias instabilities in accelerometers is provided. The method comprises removing temperature cycle hysteresis through temperature cycling, limiting durations of high acceleration load dwell times, and determining a corrected accelerometer output to compensate for bias accumulated during high acceleration load dwell times.

In still another aspect, a method of removing bias accumulation from an accelerometer measured output, the output being measured at a center point of time $t_c$, of a high acceleration load interval of more than 1 g is provided. The method comprises estimating bias accumulation at the center point of time, $t_c$, according to $$\frac{1}{2}(a(t_2) - a(t_1)),$$

where $a(t_1)$ is measured accelerometer output for a 1 g load at a time prior to a beginning of the high acceleration load interval, and $a(t_2)$ is measured accelerometer output for a 1 g load at a time after an end of the high acceleration load interval and correcting accelerometer output according to $$a_c = a(t_c) - \frac{1}{2}(a(t_2) - a(t_1)),$$

where $a(t_c)$ is measured accelerometer output at the center point of the high acceleration load interval.

In yet another aspect, a system configured to determine compensation coefficients for an accelerometer is provided. The system comprises a computer comprising a processor and a memory, a rate table comprising a chamber, and a rate table controller connected to the computer and configured to run acceleration load profiles on the rate table, the acceleration load profiles stored in the memory of the computer. The system further comprises a temperature controller connected to the computer and configured to run temperature profiles in the chamber, the temperature profiles also stored in the memory of the computer. The system also comprises a device configured to measure output of accelerometers, the computer configured to receive and store output data from the device. The computer is also configured to estimate bias accumulation from measured accelerometer outputs, determine corrected accelerometer outputs, and determine compensation coefficients using the corrected accelerometer outputs.

In a further aspect, a computer for removing bias accumulation from accelerometer measured outputs is provided, the outputs being measured at a center point of time of a high acceleration load interval of more than 1 g. The computer is configured to estimate bias accumulation at the center point of time, $t_c$, according to $$\frac{1}{2}(a(t_2) - a(t_1)),$$

where $a(t_1)$ is measured accelerometer output for a 1 g load at time prior to a beginning of the high acceleration load interval, and $a(t_2)$ is measured accelerometer output for a 1 g load at a time after an end of the high acceleration load interval and correct accelerometer output according to $$a_c = a(t_c) - \frac{1}{2}(a(t_2) - a(t_1)),$$

where $a(t_c)$ is measured accelerometer output at the center point of time.

DETAILED DESCRIPTION OF THE INVENTION

Figure 1:
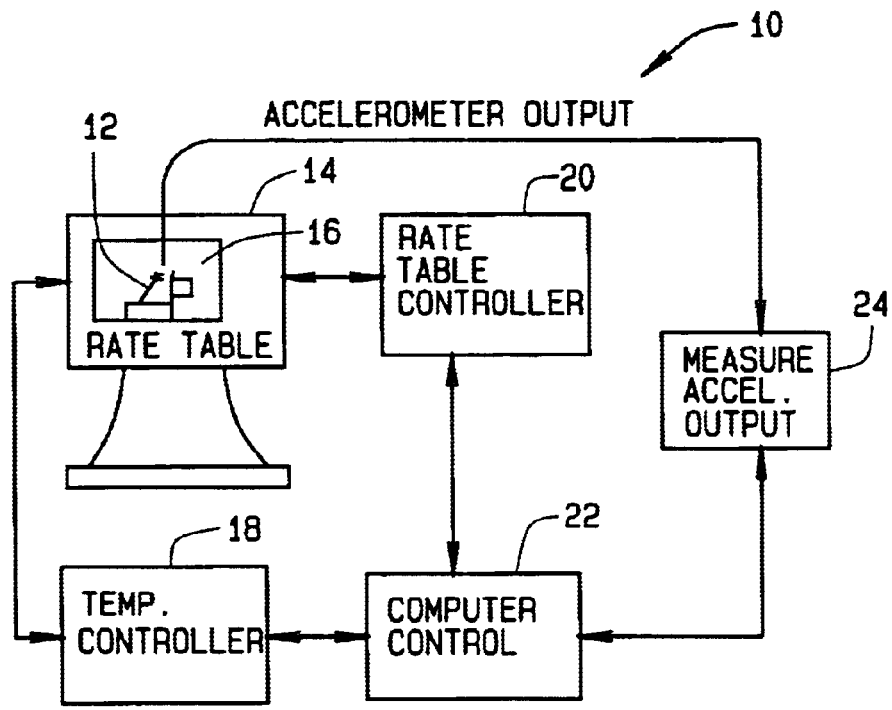
FIG. 1 is a block diagram of a high speed rate table system.

FIG. 1 is a block diagram of a high speed rate table system 10. System 10 is, in one embodiment, configured to perform temperature and acceleration testing of accelerometers 12 by application of temperature cycles and acceleration load cycles. Acceleration load cycles are implemented using a high speed rate table 14. Rate table 14 includes a chamber 16 in which accelerometers 12 are mounted. A temperature inside chamber 16 is controlled by a temperature controller 18, allowing temperature cycling. Acceleration within chamber 16 are controlled by a rate table controller 20. Temperature and acceleration cycling programs are stored in a memory (not shown) of computer control 22. Running such programs causes temperature controller 18 and rate table controller 20 to cycle temperatures and acceleration forces at table 14. Computer control 22 further receives and stores accelerometer output data from an accelerometer output measuring device 24.

In one embodiment, system 10 is configured to implement methods to remove bias instability, for example, bias accumulation. Bias accumulation can affect accuracy of compensation coefficients calculated for accelerometers. Compensation coefficients typically are calculated for individual accelerometers and stored in a memory of a device, for example, a guidance product, which processes accelerometer output as part of an overall control program.

Figure 2:
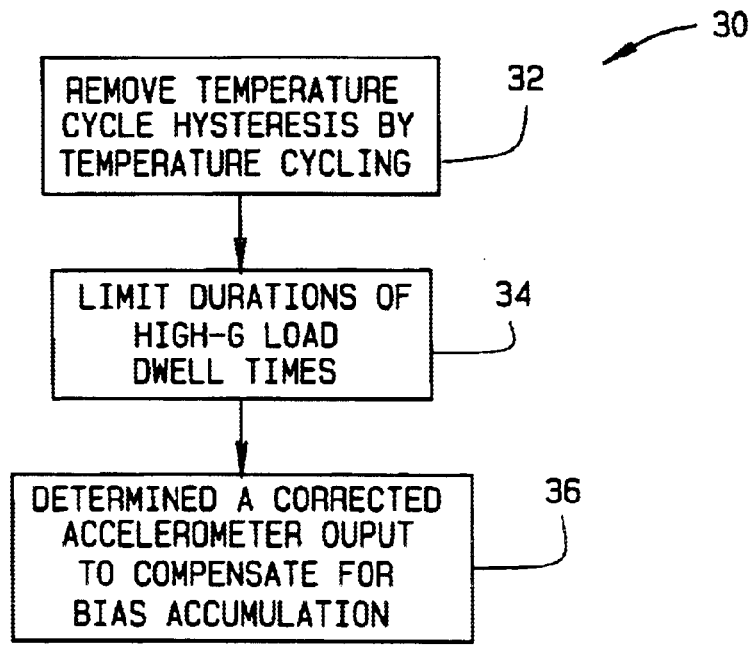
FIG. 2 is a flowchart of a method for compensation of bias instability in accelerometers.

FIG. 2 is a flow chart illustrating process steps for a method 30 for removal of bias instabilities. Method 30 could be performed, for example, by system 10 (shown in FIG. 1). Method 30 includes a determination of corrected accelerometer output to remove bias accumulation. Temperature cycle hysteresis is removed 32 through temperature cycling of the accelerometer. Bias accumulation is minimized 34 by limiting high acceleration load dwell times. A corrected accelerometer output is determined 36 to account for bias accumulation that accrues during high acceleration testing.

Figure 3:
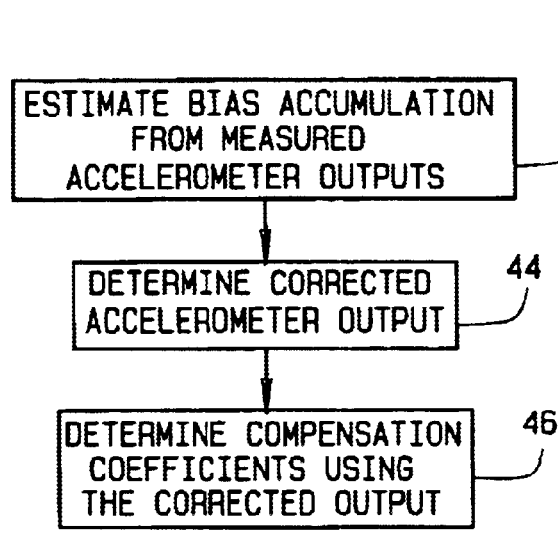
FIG. 3 is a flowchart of a compensation coefficient determination method.

FIG. 3 is a flowchart illustrating process steps for a method 40 of determining compensation coefficients for accelerometers. Method 40 could be performed, for example, by system 10 (shown in FIG. 1). Bias accumulation is estimated 42 from measured accelerometer outputs allowing a corrected accelerometer output to be calculated 44. Compensation coefficients are calculated 46 using the corrected accelerometer output.

Figure 4:
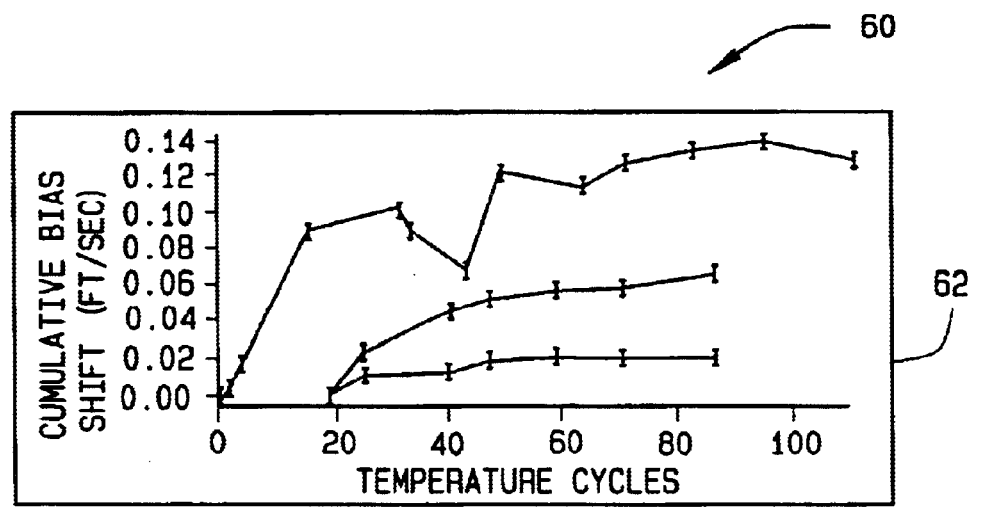
FIG. 4 is a graph illustrating bias instability due to temperature cycling.
Figure 4:
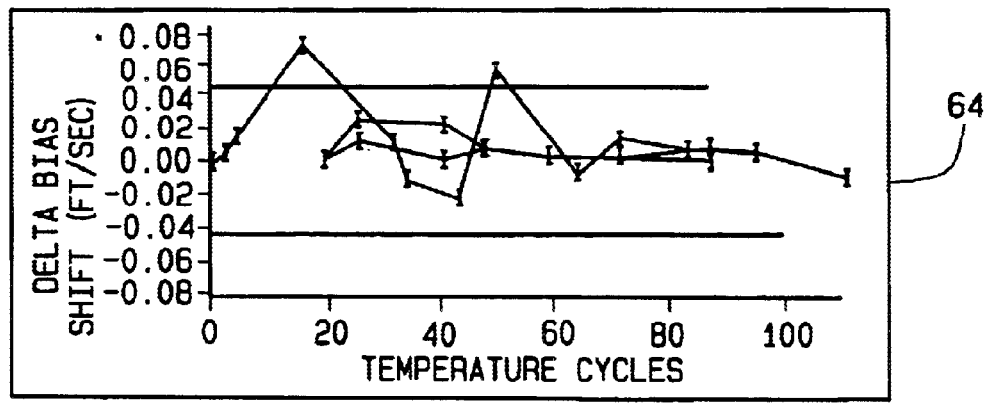

FIG. 4 is a graph 60 which illustrates bias instability due to temperature cycling. Bias instability due to temperature cycling, referred to herein as temperature cycle hysteresis is known, as are methods for reducing the amount of instability (hysteresis) through temperature cycling. Graph 60 includes a cumulative bias shift portion 62 and a change in bias shift portion 64, for three sample accelerometers. The vertical axis of portion 62 and portion 64 represent a 100 Hz integrated accelerometer output in feet per second (ft/sec), and a 1 g load corresponds to 32.15 ft/sec$^2$×0.01 sec, or 0.32 ft/sec. The hysteresis is measured, and graphed, as an accelerometer output change in ft/sec. Referring to cumulative portion 62, cumulative temperature hysteresis, is substantially exponential until about the 60th temperature cycle, at which point the cumulative change in accelerometer output approaches an asymptote. Referring to portion 64, it is noted that accelerometer output can change as much as 0.1 ft/sec over the first 40 or so temperature cycles. After about 60 cycles, changes in accelerometer bias due to temperature cycling reaches an acceptable level of change for most accelerometer applications.

Standard temperature cycling methodologies are used, including temperature ranging, with temperature ramps in degrees centigrade/minute, and dwell times at certain test temperatures. In one embodiment, standard temperature cycling is part of a method for reducing bias instability in accelerometers.

Figure 5:
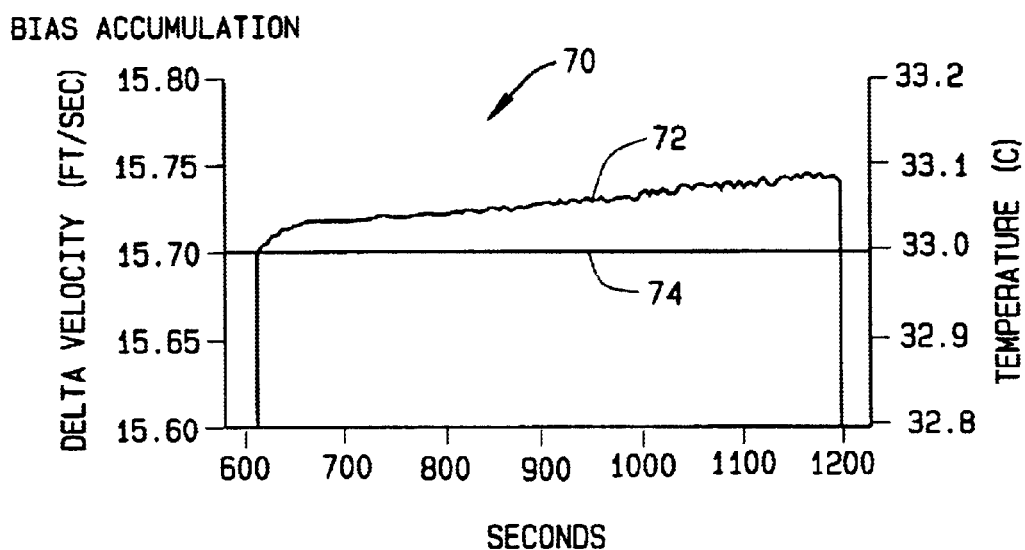
FIG. 5 is a graph illustrating bias accumulation for an accelerometer being operated at a high acceleration load.

FIG. 5 is a graph 70 illustrating bias accumulation 72 for an example accelerometer which is being operated at a high acceleration load of 50 g and a temperature 74 of 33 degrees centigrade. As shown on graph 70, under high acceleration loads, and especially at higher temperatures, accelerometers "accumulate" bias. Specifically, the accelerometer under test had operated for five minutes at 1 g prior to the application of the 50 g load. As shown on graph 70, when a high acceleration load is applied which lasts approximately five to ten minutes, bias accumulates approximately linearly. When the load is applied for a longer duration (not shown), for example, 20 minutes, accumulated bias 72 approaches an asymptote.

Figure 6:
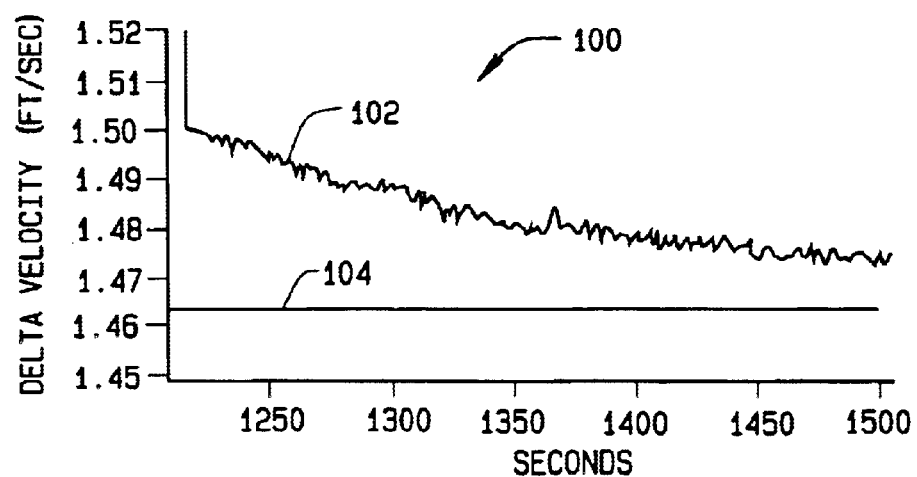
FIG. 6 is a graph illustrating decay of accumulated bias.

FIG. 6 is a graph 100 illustrating decay of accumulated bias 102. Graph 100 is a continuation in time of graph 70 (shown in FIG. 5). The decay shown on graph 100 is after reduction of a 50 g load that had been applied for ten minutes to a 1 g load. The accumulated bias 102 decays approximately exponentially with a time constant on the order of two minutes. The size of the decay is approximately equal to the bias accumulated during the high load, e.g. 50 g load, application. For one particular accelerometer and test, about 0.04 ft/sec of bias accumulated during the high load interval. For reference, a 1 g accelerometer output prior to the high load interval 104 is also shown.

Based on such accumulation and decay, an approximate rate equation for bias accumulation effect, b, is given by $\dot{b}=c_1(T)l-c_2(T)b$, where $c_1$ are temperature (T) dependent constants for a particular accelerometer, l is the load applied, and $c_2$ (T)b is a decay term.

In one embodiment, accelerometers are compensated only after temperature cycling, described above with respect to FIG. 4, reduces temperature cycle hysteresis to acceptable levels. Accelerometer testing is also implemented to reduce bias accumulation. In a particular embodiment, in order to minimize bias accumulation, high acceleration load dwell times are limited to a five second duration. Other relatively short high acceleration load dwell times are also contemplated. Load ramps, a time period when g load on an accelerometer increases from a first level to a second level, in one embodiment, occurs over an approximately 20 second time period. Other load ramping time periods are also contemplated. In the embodiment described, the load ramps occur at both the beginning of the load dwell time, that is from a 1 g load to a 50 g load, and at the end of the load dwell time, from 50 g to 1 g. In the embodiment, prior to subsequent high acceleration loads, accelerometers were operated with ±1g loads for 5–10 minutes to allow the accumulation to decay. Although the example described herein describes a high acceleration load as 50 g and a low acceleration load as 1 g, it will be appreciated that the methods described herein are applicable for other acceleration load values. Any load value where bias accumulation is an acceptable or negligible value can be considered a low acceleration load value and any load value where bias accumulation is unacceptable can be considered a high acceleration load value.

Figure 7:
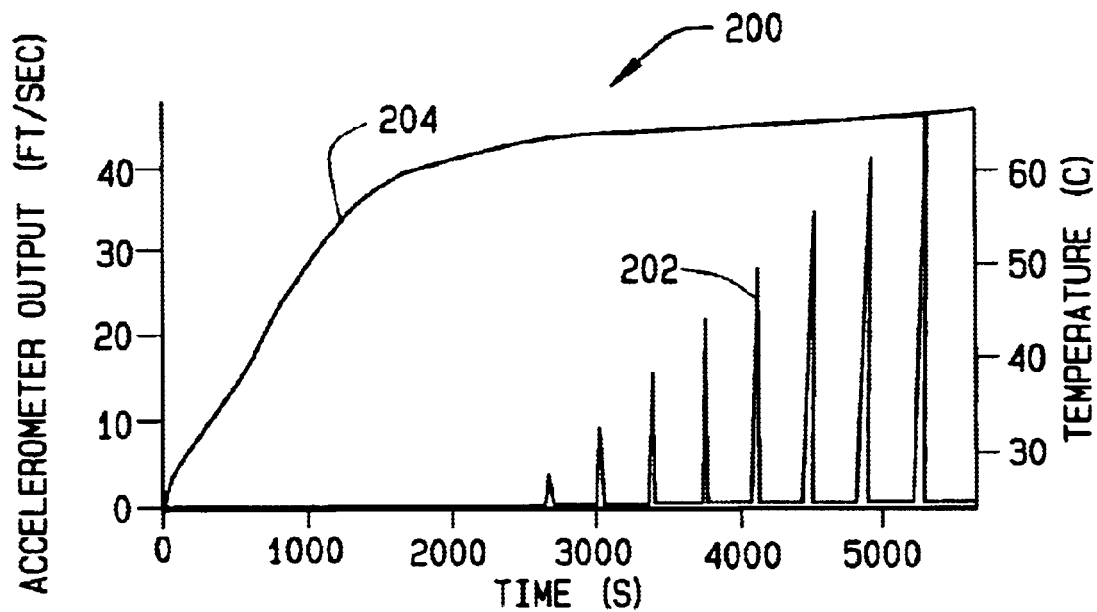
FIG. 7 is a graph illustrating a load and temperature profile for a typical accelerometer test.

FIG. 7 is a graph 200 of a load 202 and temperature 204 profile for a typical accelerometer test performed at 70 degrees centigrade. Additional accelerometer tests are performed at one or more different temperatures.

Figure 8:
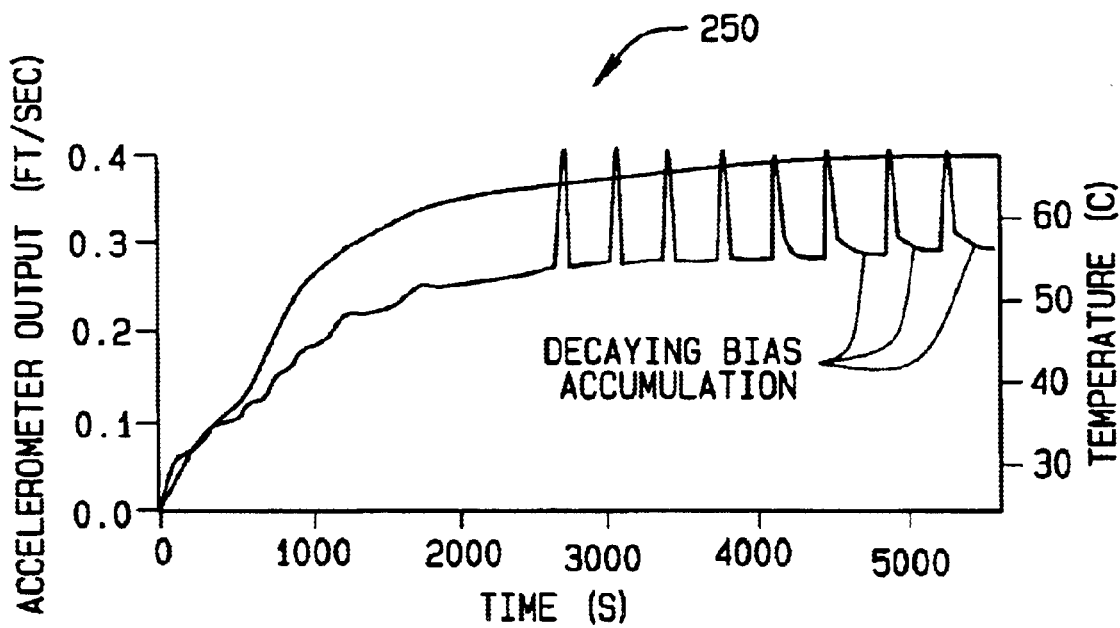
FIG. 8 is a graph illustrating the bias accumulation that accumulated during the high acceleration load periods of the accelerometer test decaying during the low acceleration load intervals.

Referring to graph 200, a first 30 to 45 minutes of the accelerometer test are used to ramp to the approximate temperature level, e.g. 70 degrees centigrade. As shown in the profile illustrated by graph 200, there is included approximately five minutes of bias accumulation decay time (i.e. low acceleration time) between applications of high acceleration loads. At temperatures at or above 45 degrees centigrade, some accelerometers require ten or more minutes of low acceleration load time between application of high acceleration loads to recover from bias accumulation. FIG. 8 is a graph 250 which shows the bias accumulation accumulated during the high acceleration load periods of the accelerometer test decaying during the low acceleration intervals. Graph 250 is the same accelerometer test as shown in graph 200, but the accelerometer output axis is charted using a finer accelerometer output scale, thereby allowing the decay in bias accumulation to be seen.

Analysis of the data from accelerometer tests is used to account for bias accumulation. Since some flight profiles of the equipment into which the accelerometers are incorporated is of such short duration, e.g. a missile flight time of four seconds, bias accumulation is negligible during flight. Therefore, bias accumulation which occurs during accelerometer testing needs to be removed from test data before compensation coefficients are determined. Bias accumulation is removed from test data by making three assumptions. First, an assumption is made that bias accumulation is negligible at the beginning of each high acceleration testing interval. The assumption is valid since the 5–10 minutes of low acceleration load time between high acceleration intervals allows previously accumulated bias to decay.

Second, it is assumed that the decay term $c_2(T)b$ is negligible during each high acceleration loading interval since the duration of the interval is a relatively short time. Such an approximation is reasonable since $|c_1(T)l|>>|c_2(T)b|$ throughout most of the testing interval, where $c_1(T)l$ is the rate of bias accumulation during high acceleration load testing.

A third assumption is that temperature does not change significantly during the short term of the high acceleration loading interval. The 30–45 minute temperature ramping and 1 g load dwell at the beginning of calibration runs allows this approximation to be made.

Figure 9:
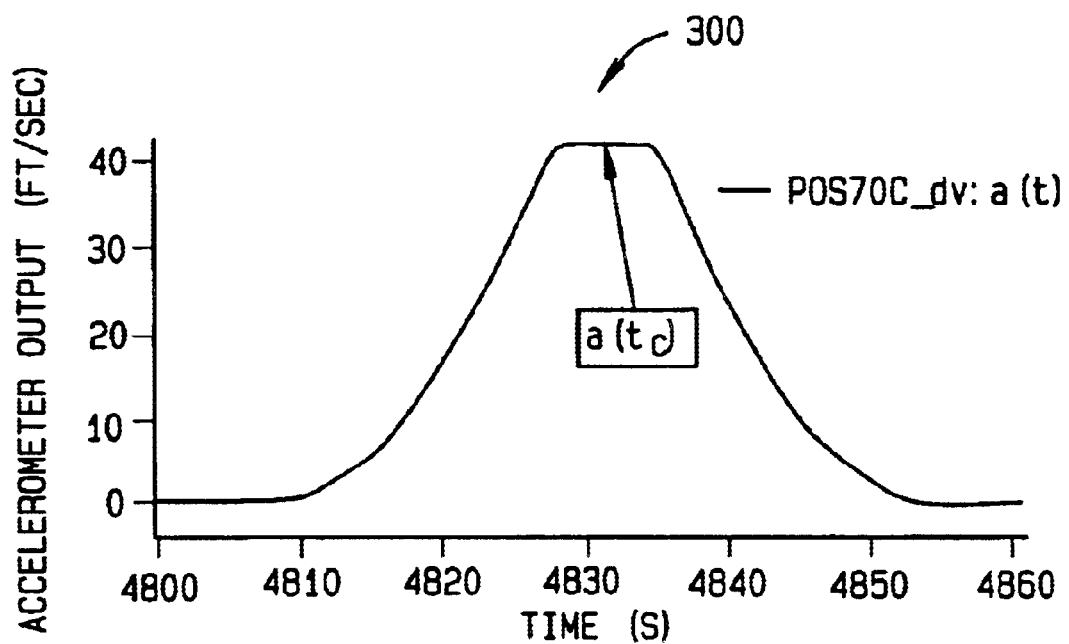
FIG. 9 is a graph illustrating an accelerometer output during a high acceleration load interval.

FIG. 9 is a graph 300 which illustrates an accelerometer output during a high acceleration interval, for example, one of the high acceleration loading intervals shown in FIG. 8. The accelerometer output indicates symmetry and an approximately five second stable region which occurs surrounding a center point in time of the high acceleration interval. In one embodiment, compensation coefficients are determined based upon accelerometer output a(t) at a center $t_c$ of the stable region. For example, and in one known testing scenario, in the middle of the high acceleration interval, an acceleration table rate is stable for approximately 5 seconds, as shown on graph 300. Referring to graph 300, accelerometer output, a, is charted as a function of time, t. Accelerometer output at a center point, $t_c$, of the stable region in each of the high acceleration intervals is used in determination of compensation coefficients. However, and as described above, bias accumulates during the acceleration ramp (application of the high acceleration load) and continues to accumulate during the time period the acceleration table rate is stable. In order to use the accelerometer output at the center point, $a(t_c)$, to determine compensation coefficients for an accelerometer, the accumulated bias at time $t_c$ should be removed.

Figure 10:
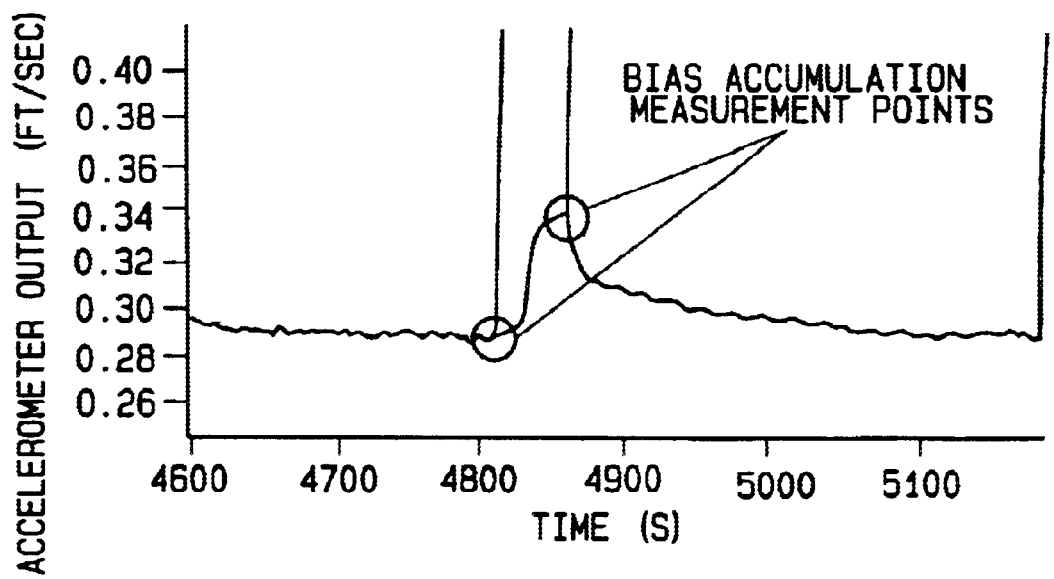
FIG. 10 is a graph illustrating bias differences due to bias accumulation between accelerometer output at a beginning and at an end of a high acceleration loading interval.

The symmetry of the high acceleration loading interval, allows an approximation of the bias accumulation at the middle of the interval. FIG. 10 is a graph 350 which indicates differences between a 1 g load accelerometer output at a time prior to a beginning and at a time after an end of a high acceleration loading interval of an accelerometer test. The differences in accelerometer output between the time prior to the beginning and the time after the end of the high acceleration load allows an approximation of the bias accumulated during the high acceleration loading interval, in particular, an approximation of the bias accumulation at the middle of the interval. Bias accumulation at the center of the stable region is considered to be one half of the bias accumulated by the end of the high acceleration interval. To approximate bias accumulated at the center of the stable region, one half of the difference of the 1 g outputs measured at the time after the end of the high acceleration interval and at the time prior to the beginning of the high acceleration interval is used. The time after the end of the high acceleration interval and the time prior to the beginning of the high acceleration interval are sometimes referred to herein as high acceleration interval endpoints. The approximated bias accumulation is then subtracted from the accelerometer output at the high acceleration load center point before determination of compensation coefficients.

Figure 11:
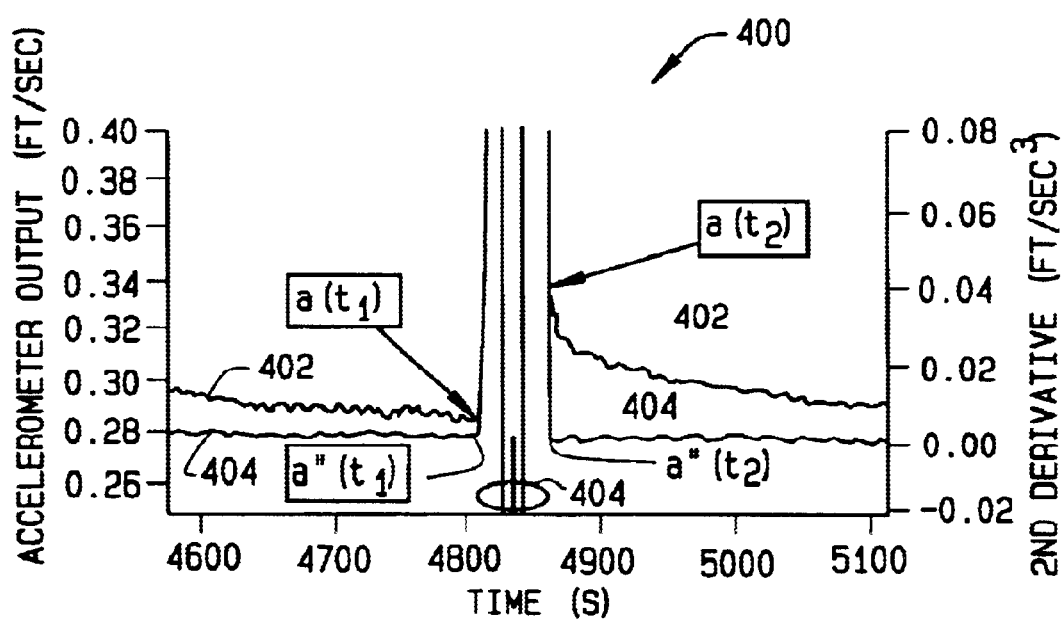
FIG. 11 is a graph illustrating accelerometer output and a second derivative of accelerometer output for during a high acceleration load interval.

FIG. 11 is a graph 400 of accelerometer output a(t) 402 and a second derivative 404 of accelerometer output a"(t) which are used, in one embodiment, to determine bias accumulation at the center of the stable region of the high acceleration interval. Location of the high acceleration interval endpoints and center of the stable high acceleration load region are determined using accelerometer output data. In one embodiment, the second derivative of the accelerometer output is used to determine the high acceleration interval endpoints because 1 g output from uncompensated accelerometers varies by accelerometer and by temperature. Graph 400 illustrates a sharp definition of the high acceleration loading interval provided by the second derivative 404. The 1 g time and output a(t) and the second derivative a"(t) of the output at the time prior to the beginning and the time after the end of the high acceleration interval are shown as $(a(t_1), a"(t_1))$ and $(a(t_2), a"(t_2))$, respectively. Once the high acceleration interval endpoints $t_1$ and $t_2$ are found, a calibration data point is determined and corrected for bias accumulation according to $$t_c = \frac{1}{2}(t_1 + t_2)$$

and $$a_c = a(t_c) - \frac{1}{2}(a(t_2) - a(t_1)).$$

Other methods for determining high acceleration interval endpoints are also contemplated, for example, first derivatives of accelerometer output.

Other error sources are taken into account when determining compensation coefficients for accelerometers, for example, effects on a radius arm of an acceleration rate table due to thermal expansion and centrifugal forces of the acceleration rate table. Positive g and negative g radius arms as a function of temperature for one known acceleration rate table are described by $r_p = 4.466 + 0.0001T + 2.13 \times 10^{-11} \theta^2$ inches and $r_n = 1.552 + 0.00005T + 1.22 \times 10^{-11} \theta^2$ inches, where T is in degrees Celsius and $\theta$ is in rotational degrees per second. Temperature and rotational rate dependent radius arms for other acceleration rate tables may be determined. For a particular temperature, rotation rate, and orientation, the change to the stationary room temperature radius can be determined using the corrections in the positive and negative g radius arm equations above.

A simulated change in velocity over 0.01 second for a particular rotation rate, temperature, and orientation, which is used in determining accelerometer compensation coefficients is given by $$dv_{load} = \frac{r_{p/n}}{1200} \left( \frac{2\pi\theta}{360} \right)^2 \text{ (ft/sec)}.$$

However, the load at $r_{p/n}$ may be different than the load at the sense element because of variation in the location of the sense element within the accelerometer package. Radius error is asymmetric with respect to direction, and is determined as part of a compensation model. Second order effects due to the location of the sense element are negligible.

In one embodiment, calibration of accelerometer output includes calculating a load during testing, which is calculated as $$\left( \frac{r_{p/n} \pm dr_{error}}{r_{p/n}} \right) dv_{load} =$$

$$(w_0 + w_1 T + dv_{out}(w_2 + w_3 T + w_4 T^2 + w_5 T^3) + w_6 dv_{out}^2),$$

where $dv_{load}$ is the change in velocity for the applied load and approximate radius arm, $r_{p/n}$, $dv_{out}$ is accelerometer output, T is temperature, $dr_{error}$ is an accelerometer sensing element radial error to be determined, and $w_i$ are calibration coefficients to be determined. To determine $dr_{error}$ and the $w_i$ coefficients, the accelerometers are tested at multiple temperatures and multiple loads, as described above, thereby producing multiple outputs. The results of these multiple tests are then used to solve for $dr_{error}$ and $w_i$ using specific $dv_{load}$, $dv_{out}$, and T for each accelerometer test performed, using known mathematical methods. $r_{p/n}$ is an approximate radius arm for positive g (p) and negative g (n) orientations. By substituting the corrected accelerometer output, $a_c$, as determined using the methods described above for the term $dv_{out}$, correct values for $dr_{error}$ and $w_i$ can be determined.

To accurately compensate for temperatures and loads during operational use in an application, for example, a guidance product, the product is configured with the compensation model $dv_{load} = (w_0 + w_1 T + dv_{out}(w_2 + w_3 T + w_4 T^2 + w_5 T^3) + w_6 dv_{out}^2)$, using the values calculated for $w_i$, and therefore the product is able to minimize errors at any operational temperature and output. In the application, bias accumulation is not removed from $dv_{out}$.

While the invention has been described in terms of various specific embodiments, those skilled in the art will recognize that the invention can be practiced with modification within the spirit and scope of the claims.

What is claimed is:

1. A method for determining compensation coefficients for accelerometers, said method comprising:
   measuring an accelerometer output at a center point of time of a high acceleration load interval, where high acceleration is greater than 1 g;
   determining the bias accumulation at the center point of time of the high acceleration interval;
   determining a corrected accelerometer output based on the bias accumulation determination; and
   determining the compensation coefficients using the corrected accelerometer output.

2. A method according to claim 1 further comprising limiting high acceleration testing dwell cycles to about five seconds, where high acceleration is greater than 1 g.

3. A method according to claim 2 further comprising operating the accelerometers at a load of between −1 g and +1 g for at least five minutes between high acceleration testing dwell cycles.

4. A method according to claim 1 wherein determining the bias accumulation comprises:
   measuring accelerometer output at a time prior to a beginning of the high acceleration. interval;
   measuring accelerometer output at a time after an end of the high acceleration interval;
   subtracting accelerometer output from the time prior to the beginning of the high acceleration interval from accelerometer output at the time after the end of the high acceleration interval; and
   multiplying the difference in the measured accelerometer outputs by one half.

5. A method according to claim 4 wherein determining a corrected accelerometer output comprises subtracting the multiplied difference from the measured accelerometer output.

6. A method according to claim 4 wherein the time prior to the beginning of the high acceleration interval and the time after the end of the high acceleration interval are determined using a second derivative of the measured accelerometer output.

7. A method according to claim 1 wherein determining the bias accumulation comprises estimating bias accumulation at a center point of time, $a_c$, of a high acceleration load interval according to $$\frac{1}{2}(a(t_2) - a(t_1)),$$

where $a(t_1)$ is measured accelerometer output at a time prior to a beginning of the high acceleration load interval, and $a(t_2)$ is measured accelerometer output at a time after an end of the high acceleration load interval, where high acceleration is greater than 1 g.

8. A method according to claim 7 wherein determining a corrected accelerometer output comprises:
   measuring accelerometer output at the center point of time; and
   correcting accelerometer output according to $$a_c = a(t_c) - \frac{1}{2}(a(t_2) - a(t_1)),$$

where $a(t_c)$ is measured accelerometer output at the center point of time.

9. A method according to claim 8 wherein determining compensation coefficients comprises calculating calibration coefficients based on accelerometer testing according to $$\left(\frac{r_{p/n} \pm dr_{error}}{r_{p/n}}\right) dv_{load} = (w_0 + w_1 T + a_c(w_2 + w_3 T + w_4 T^2 + w_5 T^3) + w_6 a_c^2),$$

where $dv_{load}$ is a change in velocity for an applied load and approximate radius arm $r_{p/n}$, $a_c$ is corrected accelerometer output, T is temperature, $r_{p/n}$ is an approximate radius arm for positive g (p) and negative g (n) orientations, $dr_{error}$ is an accelerometer sensing element radial error, and $w_i$ are calibration coefficients.

10. A method according to claim 9 further comprising
   testing accelerometers at multiple temperatures and multiple loads; and
   determining $dr_{error}$ and $w_i$, calibration coefficients using testing results which include and $dv_{load}$, $a_c$, and T from each accelerometer test.

11. A method according to claim 10 further comprising compensating for temperature and accelerometer output error according to $dv_{load} = (w_0 + w_1 T + dv_{out}(w_2 + w_3 T + w_4 T^2 + w_5 T^3) + w_6 dv_2^{out})$, using the values calculated for $w_i$, to minimize errors, where $dv_{out}$ is the accelerometer output.

12. A method for compensating for bias instabilities in accelerometers comprising:
   removing temperature cycle hysteresis through temperature cycling;
   limiting durations of high acceleration load dwell times, wherein high acceleration is an acceleration of more than 1 g; and
   determining a corrected accelerometer output to compensate for bias accumulated during the high acceleration load dwell times.

13. A method according to claim 12 wherein limiting durations of high acceleration load dwell times comprises operating the accelerometers at a load of between −1 g and +1 g for at least five minutes between high acceleration testing dwell cycles.

14. A method according to claim 12 wherein determining a corrected accelerometer output comprises:
   measuring an accelerometer output at a center point of time of a high acceleration load dwell; and
   estimating the bias accumulation at the center point of time of the high acceleration load dwell.

15. A method according to claim 14 wherein estimating the bias accumulation comprises:
   subtracting accelerometer output at a time prior to a beginning of the high acceleration interval from accelerometer output at a time after an end of the high acceleration interval;
   multiplying the difference in accelerometer outputs by one half; and
   subtracting the multiplied difference from the measured accelerometer output at the center point of time.

16. A method according to claim 15 wherein the time prior to the beginning of the high acceleration interval and the time after the end of the high acceleration interval are determined using a second derivative of the measured accelerometer output.

17. A method of removing bias accumulation from an accelerometer measured output, the output being measured at a center point of time of a high acceleration load interval, high acceleration being a load of more than 1 g, said method comprising:
   estimating bias accumulation at the center point of time, $t_c$, according to $$\frac{1}{2}(a(t_2) - a(t_1)),$$

where $a(t_1)$ is measured accelerometer output for a 1 g load at a time prior to a beginning of the high acceleration load interval, and $a(t_2)$ is measured accelerometer output for a 1 g load at a time after an end of the high acceleration load interval; and
   correcting accelerometer output according to $$a_c = a(t_c) - \frac{1}{2}(a(t_2) - a(t_1)),$$

where $a(t_c)$ is measured accelerometer output at the center point of time.

18. A system configured to determine compensation coefficients for an accelerometer, said system comprising:
   a computer comprising a processor and a memory;
   a rate table comprising a chamber;
   a rate table controller connected to said computer and configured to run acceleration load profiles on said rate table, the acceleration load profiles stored in said memory of said computer;
   a temperature controller connected to said computer and configured to run temperature profiles in said chamber, the temperature profiles stored in said memory of said computer; and
   a device configured to measure output of said accelerometer, said device, said computer configured to receive and store output data from said device, said computer configured to estimate bias accumulation from measured accelerometer outputs, determine corrected accelerometer outputs, and determine compensation coefficients using the corrected accelerometer outputs.

19. A system according to claim 18 wherein said computer is configured to limit high acceleration testing dwell cycles for accelerometers to about five seconds, where high acceleration is greater than 1g.

20. A system according to claim 18 wherein said computer is configured to operate the accelerometers at a load of between −1 g and +1 g for at least five minutes between high acceleration testing dwell cycles.

21. A system according to claim 18 wherein said computer is configured to:
   measure an accelerometer output at a center point of time of a high acceleration load interval, where high acceleration is greater than 1 g; and
   determine the bias accumulation at the center point of time of the high acceleration load interval.

22. A system according to claims 21 wherein said computer is configured to:
   measure accelerometer output at a time prior to a beginning of the high acceleration load interval;
   measure accelerometer output at a time after an end of the high acceleration load interval;
   subtract measured accelerometer output at the time prior to the beginning of the high acceleration interval from measured accelerometer output at the time after the end of the high acceleration interval;
   multiply the difference in accelerometer measured outputs by one half; and
   subtract the multiplied difference from the measured accelerometer output at the center point of time of the high acceleration load interval.

23. A system according to claim 21 wherein said computer is configured to determine the time prior to the beginning of the high acceleration interval and the time after the end of the high acceleration interval using a second derivative of measured accelerometer output.

24. A system according to claim 21 wherein said computer is configured to estimate bias accumulation at a center point of time, $a_c$, of a high acceleration load interval according to $$\frac{1}{2}(a(t_2) - a(t_1)),$$

where $a(t_1)$ is measured accelerometer output at a time prior to a beginning of the high acceleration load interval, and $a(t_2)$ is measured accelerometer output at a time after an end of the high acceleration load interval, where high acceleration is greater than 1g.

25. A system according to claim 24 wherein said computer is configured to:

measure accelerometer output at the center point of time; and correct accelerometer output according to $$a_c = a(t_c) - \frac{1}{2}(a(t_2) - a(t_1)),$$

where $a(t_c)$ is measured accelerometer output at the center point of time.

26. A system according to claim 25 wherein said computer is configured to calculate calibration coefficients based on accelerometer testing according to $$\left(\frac{r_{p/n} \pm dr_{error}}{r_{p/n}}\right) dv_{load} = (w_0 + w_1 T + a_c(w_2 + w_3 T + w_4 T^2 + w_5 T^3) + w_6 a_c^2),$$

where $dv_{load}$ is a change in velocity for an applied load and approximate radius arm $r_{p/n}$, $a_c$ is corrected accelerometer output, T is temperature, $dr_{error}$ is an accelerometer sensing element radial error to be determined using test results, and $w_i$ are calibration coefficients to be determined using test results using specific $dv_{load}$, $a_c$, and T from each test.

27. A computer for removing bias accumulation from accelerometer measured outputs, the outputs being measured at a center point of time of a high acceleration load interval, high acceleration being a load of more than 1 g. said computer configured to:

estimate bias accumulation at the center point of time, $t_c$, according to $$\frac{1}{2}(a(t_2) - a(t_1)),$$

where $a(t_1)$ is measured accelerometer output at a time prior to a beginning of the high acceleration load interval, and $a(t_2)$ is measured accelerometer output at a time after an end of the high acceleration load interval; and correct accelerometer output according to $$a_c = a(t_c) - \frac{1}{2}(a(t_2) - a(t_1)),$$

where $a(t_c)$ is measured accelerometer output at the center point of time.

* * * * *

UNITED STATES PATENT AND TRADEMARK OFFICE
CERTIFICATE OF CORRECTION

PATENT NO. : 6,826,502 B2
DATED : November 30, 2004
INVENTOR(S) : Thomas A. Savard It is certified that error appears in the above-identified patent and that said Letters Patent is hereby corrected as shown below:

Column 8,
Line 22, delete "acceleration." and insert -- acceleration --.

Column 9,
Line 22, delete "$w_6 dv_2^{out}$" and insert -- $w_6 dv^2_{out}$ --.

Signed and Sealed this

Seventh Day of March, 2006

JON W. DUDAS
*Director of the United States Patent and Trademark Office*